Patented Mar. 1, 1938

2,109,683

UNITED STATES PATENT OFFICE 2,109,683

COPPER FUNGICIDES AND METHOD OF PRODUCING THE SAME

Frank J. Seibert, Bound Brook, N. J., assignor to Chipman Chemical Company, Inc., Bound Brook, N. J., a corporation of New York No Drawing. Application June 18, 1935, Serial No. 27,210

7 Claims. (Cl. 167—16)

This invention relates to an improved copper fungicide and the method of producing the same.

So-called Bordeaux mixtures, which are mixtures made from copper sulphate and lime, have been used extensively as fungicides but are subject to certain disadvantages and objections.

One underlying disadvantage of these Bordeaux mixtures is that they are chemically unstable. It is well known that chemical changes continue to occur if a Bordeaux solution is allowed to stand. The result is that various complex copper compounds are formed. These compounds are dangerous to plant life and render the compound not only dangerous but unreliable and uncertain. It is probable that physical changes also occur and that these changes increase the unreliable and uncertain characteristics of the compounds.

While it is usually inferred that these Bordeaux mixtures are formed in accordance with the simple equation:

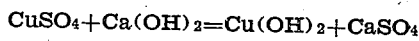

$$CuSO_4 + Ca(OH)_2 = Cu(OH)_2 + CaSO_4$$

it is my belief that the cause of their instability is the fact that the reaction indicated is not truly and completely realized; that an appreciable amount of copper sulphate, which is definitely acid, is incompletedly reacted, forming a basic copper sulphate which is also acid in character and is unstable and variable in composition.

It is usually recommended that freshly made Bordeaux mixtures be used immediately. But even this immediate use by no means solves the problem. Even freshly made mixtures are uncertain, dangerous and unreliable in their action. I have definitely proved that such freshly made mixtures, prepared cold in the usual manner, are incompletely and variably reacted, that the component parts consequently form little more than an actual "mixture" and that varying amounts of basic copper sulphate, of acid character, are always present.

Bordeaux mixtures are also prepared in dry form for subsequent use. This may, for convenience, be termed the commercial form. These commercial mixtures are subject to much the same objections. They are unstable and their varying chemical and physical composition renders them uncertain, dangerous and unreliable. It is my belief that the failure of a true and complete reaction between the copper sulphate and calcium hydroxide results in the formation of undesirable copper compounds, which continue to react during the drying process or subsequently during storage.

All these forms of Bordeaux mixtures—freshly made, old and commercial—have additional common disadvantages.

In an attempt to protect the plants it is customary to use a large excess of lime. But notwithstanding this excess there is no assurance of the absence of acid copper compounds and the lime serves primarily as a mere buffer. Even when large excesses of lime are present the use of these mixtures is restricted to plants of the hardier types. Moreover, the excess lime added to protect the plants from the copper compounds also serves to protect the fungi to a considerable extent.

A further objection to these Bordeaux mixtures is that they cannot be mixed with insecticides of the organic or sulphur types. Because of their instability and the presence of acid copper compounds which require the use of an excess of lime, organic insecticides such, for example, as rotenone and pyrethrum are decomposed upon an attempted mixture. For the same reason, a mixture with sulphur insecticides results in the formation of copper sulphide or other undesirable copper compounds.

This inability to mix with certain insecticides and fungicides is often a serious disadvantage to the grower because of the time and expense involved in separate applications.

Further, Bordeaux mixtures cannot be mixed with many spreaders and stickers, such mixtures being limited to products that are compatible with lime.

Certain so-called basic copper sulphates have also been used as fungicides but these are subject to much the same objections and disadvantages as the Bordeaux mixtures previously used.

It is an object of the present invention to provide a copper fungicide that avoids the objectionable and disadvantageous features of Bordeaux mixtures and basic copper sulphate mixtures.

More particularly, it is an object of the invention to provide a copper fungicide that can be safely used on even the more delicate types of plants; one that can be produced in powder form for subsequent use in that form or in liquid form, and that is safe and reliable regardless of lapse of time; one that does not depend for safety on dilution by lime and hence is highly efficient; and one that can be mixed with other desired insecticides or fungicides and thus attain the advantage of a single application.

It is still a further object of the invention to provide such a fungicide in a simple and economical manner.

I have discovered that improved fungicidal protection with practical safety can be attained by the use of a neutral and stable copper compound. While various compounds of such characteristics may be used, I have found that a satisfactory compound comprises essentially copper hydroxide in the absence of any substantial amount of any acid copper compound. As a result of my investigations, I have discovered that copper sulphate may be combined with one or more reaction agents in such a manner and under such conditions that the end product is substantially free of copper sulphate or other acid copper compounds. That is, the product is neutral and chemically stable, but provides a high degree of fungicidal action.

Such a product may be attained, for example, by combining copper sulphate and calcium hydroxide in such a manner and under such conditions that a true and complete reaction takes place, resulting in the formation of copper hydroxide and calcium sulphate. This reaction may be expressed, for purposes of explanation, by the simple equation:

$$CuSO_4 + Ca(OH)_2 = Cu(OH)_2 + CaSO_4$$

Whether the reaction is that simple or more complex, the result is a stable and neutral compound as compared to the unstable and complex character of Bordeaux mixtures in which the reaction is not true or complete.

According to the present invention, in order to obtain a true and complete reaction, the compounding is effected in the presence of heat. This may preferably be accomplished by heating a solution of copper sulphate and adding it to the calcium hydroxide. In carrying out the invention to what is now considered the best advantage, I heat a copper sulphate solution to about 160° F. While the temperature may vary, it should preferably be kept within the range of 150°–170° F. If the solution is not sufficiently heated the reaction takes place so slowly as to be uncertain; if the solution is too hot, the result is apt to be the formation of black copper oxide and other undesirable products. The heated solution is then added slowly to an aqueous suspension of calcium hydroxide, which necessarily includes lime water (calcium hydroxide in solution, to the extent of its solubility).

While the above described procedure is considered as preferable, it is not essential. The desired results may be attained by applying the heat in a different manner. For example, the calcium hydroxide may be heated, e. g. to 80° or 90° F., the copper sulphate solution added thereto, and the whole heated to about 160° F.

While the relative proportions of the two ingredients may vary, in carrying out the invention to what is now considered the best advantage, not only should there ultimately be no unreacted copper sulphate present but in addition there should be no unreacted calcium hydroxide.

The desired end may be attained in various ways. For example, there can be used enough and just enough copper sulphate to satisfy completely the reaction with the calcium hydroxide. That is, under what may be termed ideal conditions, the ingredients are present in molecular proportions.

Under the conditions of compounding above described, a true and complete reaction takes place and with the ingredients present in molecular proportions the reaction is completely satisfied. The resulting compound, being substantially free of copper sulphate or other acid copper compounds, is and remains stable and neutral; being substantially free of any unreacted calcium hydroxide, the compound has a maximum of copper hydroxide and so has a maximum fungicidal efficiency without having harmful effects on plant life.

The compound may be used in this liquid form as a so-called freshly made fungicide or it may be allowed to settle and the precipitate dried and milled. In the latter case, the resulting dry powder is what may be termed the commercial form of the compound and may be used dry or may be later mixed with water for spraying as occasion may demand.

It is recognized that it may be difficult to realize, in commercial practice, the ideal conditions, as to relative proportions, above referred to. According to the invention in its entirety, therefore, the same ultimate end, namely, an end product having substantially no unreacted copper sulphate or calcium hydroxide, may be attained in other ways. For example, it may be done by using a slight excess of copper sulphate in the reaction described and then freeing the reaction products of any unreacted copper sulphate that remains.

This may be accomplished in various ways. For example, it may be accomplished by neutralizing the remaining copper sulphate by means of a second reaction agent. Or the remaining copper sulphate may be removed physically by repeated decantations after settling. Or a combination of those methods may be utilized.

While the neutralizing agent may vary, sodium carbonate has been found suitable. It is to be understood, however, that other alkaline hydroxides and carbonates may be used.

According to a procedure that has been found satisfactory, the first reaction is carried out as above described except that a slight excess of copper sulphate is used. This reaction may be expressed, for purposes of explanation, by the simple equation:

$$CuSO_4 + Ca(OH)_2 + xCuSO_4 = Cu(OH)_2 + CaSO_4 + xCuSO_4$$

where $x$ equals the excess amount of copper sulphate.

As a result of this reaction the calcium hydroxide is completely reacted but there remains a slight amount of unreacted copper sulphate. The mixture is allowed to settle and the bulk of the liquid is decanted. This decanted material will contain the greater part of the remaining copper sulphate. Then the neutralizing agent, e. g. sodium carbonate, is added and the mixture is thoroughly agitated to permit the sodium carbonate to combine with the copper sulphate. As a result, copper carbonate and sodium sulphate are formed.

This may be expressed, for explanatory purposes, by the simple equation:

$$Cu(OH)_2 + 2CuSO_4 + 2Na_2CO_3 + H_2O = Cu(OH)_2 + CuCO_3, Cu(OH)_2 + 2Na_2SO_4 + CO_2$$

As before, the resulting compound may be used as freshly made fungicide or it may be allowed to settle and the precipitate dried and milled, giving the commercial form of the compound.

If no neutralizing agent is to be used, water is added after the first decanting, the mixture further agitated and again allowed to settle. The water is again decanted, thus removing more copper sulphate and these steps are repeated until all the remaining copper sulphate has been removed. The final precipitate is dried and milled to obtain the commercial form of the product. If the freshly made form is desired the necessary water is re-added following the final decanting.

Whether or not an excess of copper sulphate is used in the formation of the compound, the result in either case is a copper fungicide that avoids all the above mentioned objections to Bordeaux mixtures. In the first case, there is no remaining copper sulphate and so no undesirable reaction products. In the second case, by the neutralization or removal of the excess copper sulphate the reaction products are freed of acid, the copper carbonate is not subject to reaction with the copper hydroxide and the ultimate result is the same.

The resulting compound is a neutral and stable copper fungicide that is reliable, safe and efficient.

As it is neutral and stable, the dosage can be adjusted with certainty whereby it can be applied to even the more delicate types of plants with safety. Being stable, it is equally safe and effective regardless of age and so provides a satisfactory commercial form of fungicide. It is economical to produce. It can be used effectively either in liquid form or as a dusting powder. It can be mixed with most wetting, spreading and sticking agents. Since no excess lime is used or required, the compound has a greatly increased fungicidal action in proportion to the actual copper content and less metallic copper is necessary as compared to Bordeaux mixtures. The compound, moreover, can be finished to a maximum particle fineness, insuring close association with leaf surfaces.

The invention in its entirety includes a compound for treating plants comprising essentially a neutral and stable copper fungicide and an insecticide of the sulphur or organic type. The copper fungicide above described, being neutral and stable may be mixed with a sulphur insecticide without the formation of copper sulphide or other undesirable copper compounds. It may also be mixed with organic insecticides such as rotenone and pyrethrum, without decomposition of the latter. Such combined fungicides and insecticides result in a high degree of economy to the user since both a fungicidal and an insecticidal action are obtained with one application instead of separate applications.

It is to be understood that where the compound of the present invention is referred to in the claims herein, the terms "fungicide" and "compound" are intended to include, unless otherwise specified, the fungicidal compound either in liquid form or in dry form and, if in liquid form, either with or without having passed through a dry form.

What is claimed is:

1. The method of producing a neutral and stable copper fungicide, which comprises combining a copper sulphate solution and calcium hydroxide in such proportions that the copper sulphate is present in excess of molecular proportions, applying heat so as to give the mixture a temperature sufficient to cause a substantially complete reaction to take place, and neutralizing the unreacted copper sulphate remaining from the first mentioned reaction.

2. The method of producing a neutral and stable copper fungicide, which comprises combining a copper sulphate solution and calcium hydroxide in such proportions that the copper sulphate is present in excess of molecular proportions, applying heat so as to give the mixture a temperature sufficient to cause a substantially complete reaction to take place, and adding a material selected from the class consisting of alkaline hydroxides and carbonates to neutralize the unreacted copper sulphate remaining from the first mentioned reaction.

3. The method of producing a neutral and stable copper fungicide, which comprises combining a copper sulphate solution and calcium hydroxide in such proportions that the copper sulphate is present in excess of molecular proportions, applying heat so as to give the mixture a temperature sufficient to cause a substantially complete reaction to take place, and adding sodium carbonate to neutralize the unreacted copper sulphate remaining from the first mentioned reaction.

4. A neutral and stable fungicide comprising the reaction product which results from combining sodium carbonate with the intermediate reaction product which results from combining copper sulphate and calcium hydroxide in the presence of heat and with the copper sulphate present in excess of molecular proportions.

5. A neutral and stable fungicide comprising the reaction product which results from combining a material selected from the class consisting of alkaline hydroxides and carbonates with the intermediate reaction product which results from combining copper sulphate and calcium hydroxide in the presence of heat and with the copper sulphate present in excess of molecular proportions.

6. A composition of matter comprising the reaction product which results from combining copper sulphate and calcium hydroxide in the presence of heat and with the copper sulphate present in excess of molecular proportions.

7. The method of producing a neutral and stable copper fungicide, which comprises combining a copper sulphate solution and calcium hydroxide in such proportions that the copper sulphate is present in excess of molecular proportions, applying heat so as to give the mixture a reaction temperature of between approximately 150° F. and 170° F., and neutralizing the unreacted copper sulphate remaining from the first mentioned reaction.

FRANK J. SEIBERT.